US007938086B2

(12) United States Patent  
Cobb et al.

(10) Patent No.: US 7,938,086 B2  
(45) Date of Patent: May 10, 2011

(54) MULTIPURPOSE LEASH

(75) Inventors: Ann Cobb, Northfield, IL (US); Michael Jayko, Northfield, IL (US)

(73) Assignee: Your Dog's Guru, Inc., Northfield, IL (US)

( * ) Notice: Subject to any disclaimer, the term of this patent is extended or adjusted under 35 U.S.C. 154(b) by 675 days.

(21) Appl. No.: 11/971,519

(22) Filed: Jan. 9, 2008

(65) Prior Publication Data

US 2009/0173289 A1   Jul. 9, 2009

(51) Int. Cl.
*A01K 27/00*    (2006.01)
(52) U.S. Cl. ........................................ 119/770; 119/795
(58) Field of Classification Search .................. 119/770, 119/792, 795, 797, 798
See application file for complete search history.

(56) References Cited

U.S. PATENT DOCUMENTS

| 153,724 | A | * | 8/1874 | Schmidt ............................ 54/34 |
| 2,232,163 | A | * | 2/1941 | Brecht ........................... 119/770 |
| 2,827,017 | A | * | 3/1958 | Ryan ............................. 119/795 |
| 2,861,547 | A | * | 11/1958 | Dale ............................. 119/797 |
| 3,752,127 | A | * | 8/1973 | Baker ........................... 119/797 |
| 4,763,609 | A | | 8/1988 | Kulik |
| 5,325,819 | A | * | 7/1994 | Krauss ........................... 119/792 |
| 5,351,654 | A | * | 10/1994 | Fuentes .......................... 119/770 |
| 5,456,213 | A | * | 10/1995 | Beauchamp .................... 119/793 |
| 5,462,019 | A | * | 10/1995 | Hong-Rong et al. ........... 119/795 |
| 5,470,119 | A | * | 11/1995 | Huf ............................... 294/157 |
| 5,483,925 | A | * | 1/1996 | Childress ....................... 119/795 |
| 5,511,293 | A | * | 4/1996 | Hubbard et al. ................ 24/442 |
| D370,751 | S | * | 6/1996 | Hodgson ....................... D30/153 |
| 5,551,379 | A | * | 9/1996 | Hart ............................... 119/771 |
| 5,551,380 | A | * | 9/1996 | Hodgson ....................... 119/795 |
| D375,587 | S | * | 11/1996 | Maglich ........................ D30/153 |
| 5,632,234 | A | * | 5/1997 | Parker ........................... 119/795 |
| 5,649,504 | A | * | 7/1997 | Culp ............................. 119/795 |
| 5,701,848 | A | * | 12/1997 | Tozawa ......................... 119/797 |
| 5,709,172 | A | * | 1/1998 | Maglich ........................ 119/797 |
| 5,718,189 | A | * | 2/1998 | Blake ............................ 119/770 |
| D431,885 | S | * | 10/2000 | Gellenbeck ................... D30/153 |
| D454,235 | S | | 3/2002 | Kaplan |
| D454,670 | S | | 3/2002 | Weller |
| D454,992 | S | | 3/2002 | Yantz |
| D456,957 | S | * | 5/2002 | Koch ............................ D30/152 |
| 6,662,753 | B1 | * | 12/2003 | Sporn ........................... 119/797 |
| 6,745,722 | B1 | * | 6/2004 | Quilling ........................ 119/795 |
| 6,755,755 | B2 | * | 6/2004 | Wah Loh ....................... 473/458 |

(Continued)

FOREIGN PATENT DOCUMENTS

GB       2039705 A   *   8/1980

*Primary Examiner* — Yvonne R. Abbott  
(74) *Attorney, Agent, or Firm* — Miller Canfield, Paddock and Stone, P.L.C.; Timothy Engling

(57) ABSTRACT

A multipurpose leash including an elongated strap, a fastener on each end of the strap, an adjustable ring that is movable along the strap, and at least one stationary ring attached to the strap, such as a first stationary ring affixed at an end of the strap and a second stationary ring attached along the length of the strap. The adjustable ring preferably slides along the strap with an oval, circular or D-shaped ring transverse to the strap. The multiple uses and functions include use with two pets, hands-free use with one end of the strap capable of being wrapped around the waist of the human user, and an adjustable length with fasteners connected to various rings.

22 Claims, 3 Drawing Sheets

U.S. PATENT DOCUMENTS

| | | |
|---|---|---|
| 6,851,393 B2 | 2/2005 | Bremm |
| D519,686 S | 4/2006 | Alameddine et al. |
| 7,096,827 B2 * | 8/2006 | Sporn .................... 119/797 |
| 7,243,615 B1 * | 7/2007 | Hendrie .................... 119/792 |
| 7,743,735 B2 * | 6/2010 | Weinberg .................... 119/795 |
| 2010/0050956 A1 * | 3/2010 | Pellei .................... 119/770 |

* cited by examiner

MULTIPURPOSE LEASH

BACKGROUND

This disclosure relates to a multipurpose leash with fasteners on each end of a strap. More specifically, the multipurpose leash includes multiple rings and fasteners adapted to be secured to various rings.

Several patents disclose various adjustable leashes. For example, U.S. Pat. No. 2,861,547 discloses an adjustable leash including connectors on each end with a D-ring (18) associated with one end. The adjustable leash includes three fixed rings.

U.S. Pat. No. 3,752,127 discloses a leash for an animal including connectors on each end wherein the strap bent back upon itself forms a loop. The leash includes a D-ring on one end that can receive the opposite connector. The strap includes two buckles (13 and 14) that allow for adjustment.

U.S. Pat. No. 5,351,654 discloses an adjustable lead and tethering device with a pair of connected looped straps and a spacer element (22) at the looped end of the connecting strap. Each end of the strap has a connector, and multiple D-rings are disposed along the length of the device.

U.S. Pat. No. 6,662,753 discloses a multifunctional animal leash with connectors on each end and multiple rings along the length of the leash. D-ring (18) is disclosed along with a tri-glide (20) that comprises a buckle type device and multiple rungs to permit the tri-glide to move up and down the strap. The tri-glide is slideable in order for the attached ring to receive the connector hook.

Various separate harnesses and belts to which leashes can be attached are known for hands-free use, such as for jogging etc., but these require multiple pieces.

SUMMARY

The multipurpose leash includes an elongated strap, a fastener on each end of the strap, an adjustable ring that is movable along the strap, and at least one stationary ring attached to the strap, such as a first stationary ring affixed at an end of the strap and a second stationary ring attached along the length of the strap.

The present disclosure provides a leash with fasteners on each end of the elongated strap, which allows for use with two pets. The multiple-use leash also can be used "hands-free" with one end wrapped around the waist of the human user, by using the adjustable ring to accommodate adjustability and easy attachment with an end fastener. In conjunction with rings along the strap, the length of the leash can be adjusted.

BRIEF DESCRIPTION OF THE DRAWING

The above-mentioned and other features of this disclosure and the manner of obtaining them will become more apparent, and the disclosure itself will be best understood by reference to the following descriptions of the leash taken in conjunction with the accompanying figures, which are given as a non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, an embodiment with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
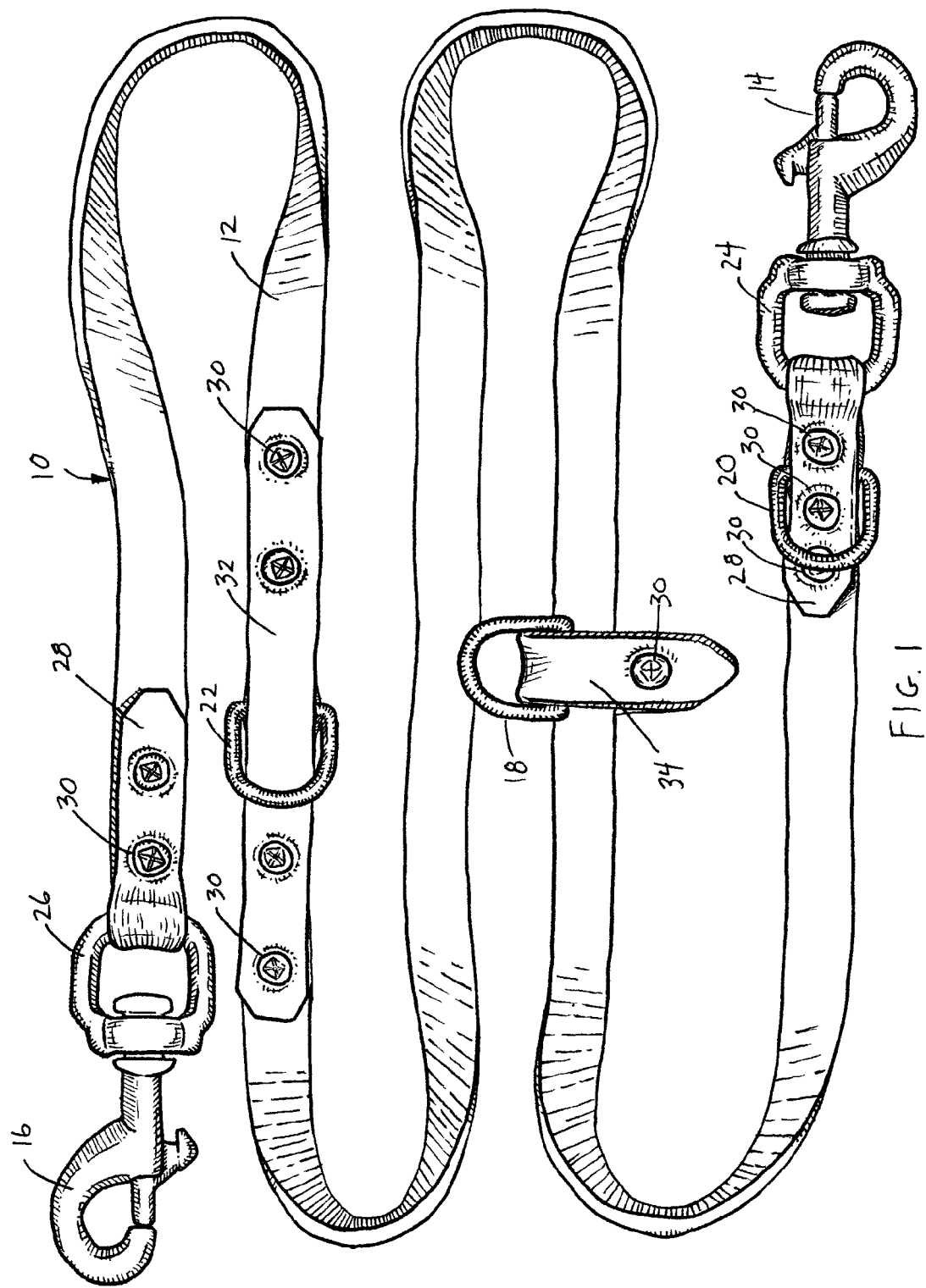
FIG. 1 is a multipurpose leash.

As shown in FIG. 1, a pet controlling multipurpose leash 10 includes an elongated strap 12, fasteners 14 and 16 located at each end of the elongated strap 12, an adjustable ring 18 that is movable along the strap 12, and at least one stationary ring attached to the strap 12, such as a first stationary ring 20 affixed at an end of the strap 12 and a second stationary ring 22 attached along the length of the strap 12.

The fasteners 14 and 16 are preferably swivelable snap connectors, which can be directly or indirectly attached to the strap 12. Indirectly, the swivelable snap connectors 14 and 16 can be attached on hoops 24 and 26 respectively, secured on each end of the elongated strap 12. The fasteners 14 and 16 can be snap connector hook type or like fasteners known in the art that can be affixed at each end of the strap 12.

The base of the fasteners 14 and 16 or the associated hoops 24 and 26, if used, can be secured to the strap 12 by folding the strap 12 over onto itself to form a folded-over portion 28 wherein rivets 30 through the folded-over portion 28 are used to secure the base of the fasteners 14 and 16 or the associated hoops 24 and 26 inside the folded-over portion 28. As shown in FIG. 1, the first stationary ring 20 similarly can be attached to the strap 12 at an end of the strap 12 wherein the strap 12 is folded over to affix both fastener 14 and the first stationary ring 20. The first stationary ring 20 can be secured within the folded-over strap portion 28 with one rivet 30 on each side of the first stationary ring 20. Another stationary ring could likewise be attached on the opposite folded-over portion 28 at the other end of the strap 12.

A second stationary ring 22 can be attached along the length of the strap 12 by various means. As shown in FIG. 1, a small strip 32 can be attached to the strap 12 by rivets 30 wherein the second stationary ring 22 is attached between the strap 12 and strip 32, also between at least one rivet 30 on each side of the second stationary ring 22.

The adjustable ring 18 is movable along the length of the strap 12. An adjustable ring 18 can slide along a portion of the length of the strap 12. The adjustable ring 18 preferably slides along the strap 12 with an oval, circular, or D-shaped ring transverse to the strap 12. The adjustable ring 18 can be attached to the strap 12 by a band 34 (including a loop) of material that slides along the strap 12 with the adjustable ring 18 transverse to the strap 12. A rivet 30 can close the band 34 allowing the band 34 to surround and be secured to the strap 12. The adjustable ring 18 is preferably attached on the strap 12 between the first and second stationary rings 20 and 22. If the band 34 is leather or similar materials, the smooth side can face outward with the rougher surface inward to provide friction of the band 34 against the strap 12.

Figure 2:
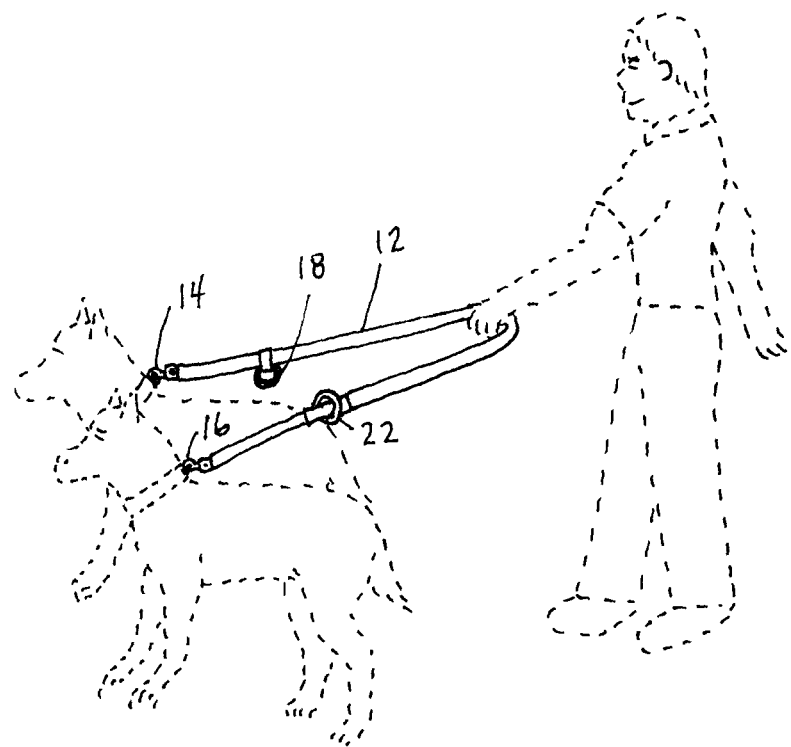
FIG. 2 shows the use with fasteners on both ends of the strap attached to one pet each.

The multipurpose leash 10 can be adapted for various uses As shown in FIG. 2, the leash 10 may be used with two dogs at one time with each fastener 14 and 16 snapped onto a dog's collar with the person holding the center of the strap 12.

Figure 3:
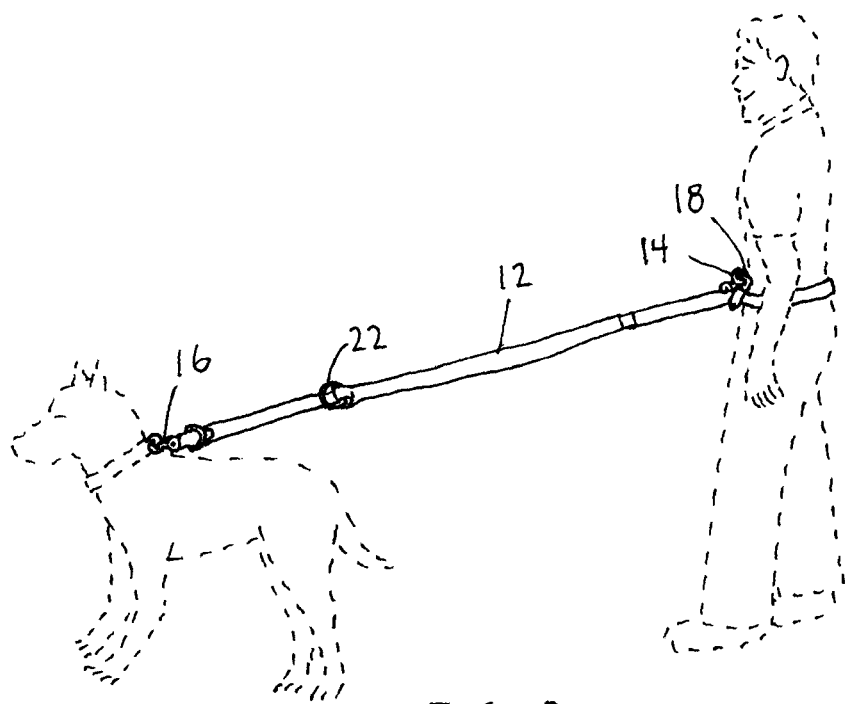
FIG. 3 shows "hands-free" use with one end wrapped around the waist of the human user.
Figure 4:
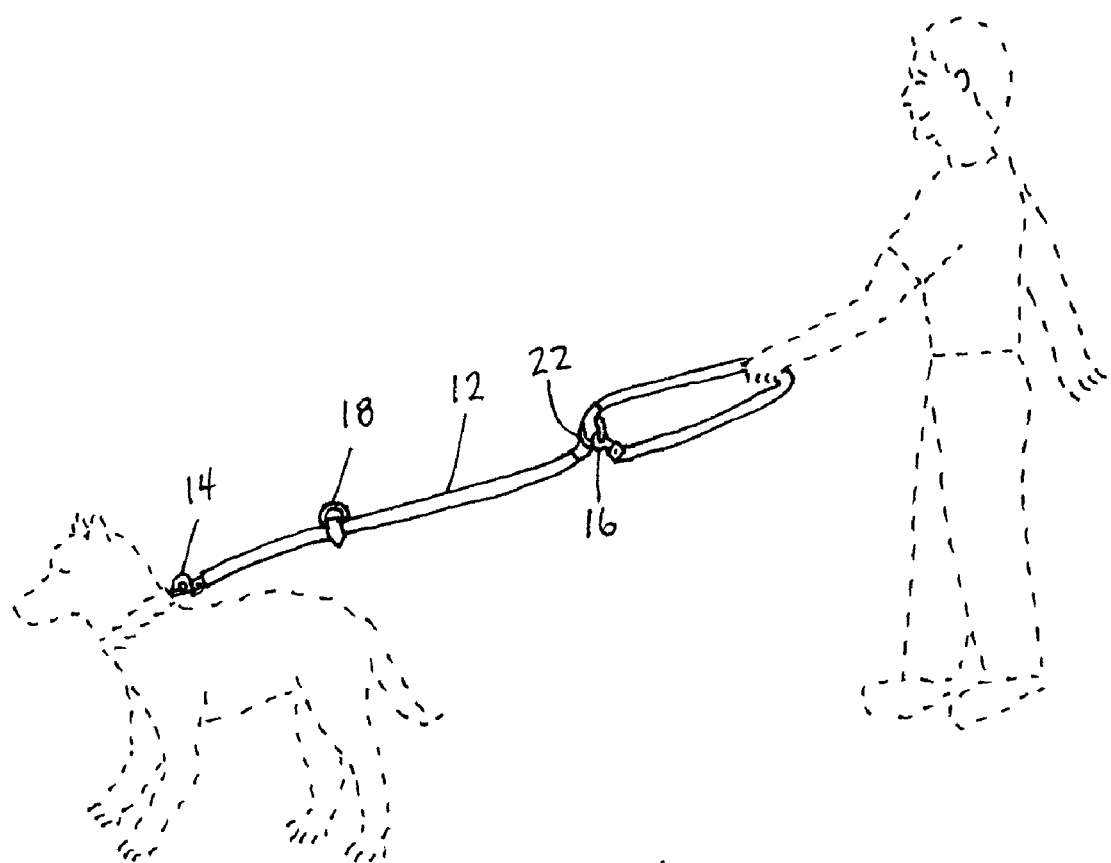
FIG. 4 shows the leash with an adjusted length.

Further, either fastener 14 or 16 can be attached to various rings, 18, 20 or 22. At one end with a fastener 14, a stationary ring 20 is shown. Along a portion of the strap 12, the adjustable ring 18 can slide along the strap 12 to allow for hands-free use of the leash 10 as shown in FIG. 3. This allows that end of the strap 12 to be wrapped around and secured to a person's waist for hands-free use. The other end of the strap 12 also has a fastener 16 and a stationary ring 22 toward that end. This arrangement is particularly suitable for use while training a dog. The leash 10 has an adjustable length. As shown in FIG. 4, the fastener 16 adjacent to the stationary ring 22 can be fastened to the second stationary ring 22 forming a handle loop in the strap 12.

The strap 12, fasteners 14 and 16 and rings 18, 20 and 22 are preferably "integral" so no pieces need be or can be removed from the leash 10.

The strap can be made of any suitable elongated flexible material, such as leather or nylon. The rings and fasteners are preferably metal, but could be made of plastic or other materials. While rivets 30 are preferred to secure portions of the strap 12 to form folded-over portions 28, attach the strip 32, and form a loop in the band 34, other securing means such as a pin, a staple, glue or heat sealing could be used.

This disclosure has been described as having an exemplary embodiment and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such departures from the present disclosure as come within the known or customary practice within the art to which it pertains.

What is claimed is:

1. A multipurpose leash including:
   an elongated strap;
   an adjustable ring that is movable along the strap;
   at least one stationary ring attached to the strap; and
   a fastener on each end of the strap
   wherein the adjustable ring slides along the strap with the adjustable ring transverse to the strap.
2. The multipurpose leash of claim 1 wherein the adjustable ring is D-shaped.
3. The multipurpose leash of claim 1 wherein the fasteners are swivelable snap connectors.
4. The multipurpose leash of claim 1 wherein the fasteners are swivelable snap connectors attached on hoops secured on each end of the strap.
5. The multipurpose leash of claim 1 wherein the stationary ring is attached at an end of the strap wherein the strap is folded over to affix one fastener and the stationary ring.
6. The multipurpose leash of claim 5 wherein rivets through the strap secure the stationary ring with a folded-over strap portion with one rivet on each side of the stationary ring.
7. The multipurpose leash of claim 1 wherein one fastener can be fastened to the adjustable ring to form a hands-free leash that can be used with one portion of the strap wrapped around the user's waist.
8. The multipurpose leash of claim 1 wherein the stationary ring is attached along the length of the strap.
9. The multipurpose leash of claim 8 wherein the stationary ring is attached so that when the fastener adjacent to the stationary ring is fastened to the stationary ring a handle loop is formed in the strap.
10. The multipurpose leash of claim 8 wherein one fastener can be fastened to the adjustable ring to form a hands-free leash that can be used with one portion of the strap wrapped around the user's waist and wherein one fastener can be fastened to the stationary ring to form a handle loop in the strap.
11. The multipurpose leash of claim 1 wherein the strap is leather.
12. The multipurpose leash of claim 1 wherein the strap is nylon.
13. A multipurpose leash including:
    an elongated strap;
    an adjustable ring that is movable along the strap;
    at least one stationary ring attached to the strap;
    a fastener on each end of the strap
    a first stationary ring affixed at an end of the strap and a second stationary ring attached along the length of the strap with the adjustable ring attached on the strap between the first and second stationary rings.
14. A multipurpose leash including:
    an elongated strap;
    an adjustable ring that is movable along the strap;
    at least one stationary ring attached to the strap; and
    a fastener on each end of the strap
    wherein the adjustable ring is attached to the strap by a band of material surrounding the strap that slides along the strap so the adjustable ring is transverse to the strap.
15. A multipurpose integral leash including:
    an elongated strap;
    an adjustable ring that is movable along the strap; the adjustable ring is attached to the strap by a band of material surrounding the strap that moves along the strap with the adjustable ring transverse to the strap;
    a snap connector on each end of the strap;
    a first stationary ring attached at an end of the strap wherein the strap is folded over to affix one snap connector and the first stationary ring; and
    a second stationary ring attached along the length of the strap.
16. The multipurpose leash of claim 15 wherein the rings are D-shaped with the flat portion attached to the strap.
17. The multipurpose leash of claim 15 wherein the snap connector adjacent to the first stationary ring can be fastened to the adjustable ring forming a hands-free leash that can be used the with one portion of the strap wrapped around the user's waist and wherein the snap connector adjacent to the secondary stationary ring can be fastened to the secondary stationary ring forming a handle loop in the strap.
18. A multipurpose integral leash consisting essentially of:
    an elongated flexible strap with ends forming folded-over portions;
    an adjustable ring that is slideable along the strap; the adjustable ring is attached to the strap by a band of material surrounding the strap that slides along the strap with the adjustable ring transverse to the strap;
    a snap connector on each end of the strap secured in each folded-over portion;
    a first stationary ring attached in one folded-over portion with one adjacent snap connector; and
    a second stationary ring attached along the length of the strap between a small strip secured to the strap; wherein the adjustable ring is between the first stationary ring and the second stationary ring.
19. The multipurpose leash of claim 18 wherein the snap connector adjacent to the first stationary ring can be fastened to the adjustable ring forming a hands-free leash that can be used the with one portion of the strap wrapped around the user's waist and wherein the snap connector adjacent to the secondary stationary ring can be fastened to the secondary stationary ring forming a handle loop in the strap.

20. The multipurpose leash of claim 18 wherein the adjustable ring is oval.

21. The multipurpose leash of claim 18 wherein the adjustable ring is circular.

22. The multipurpose leash of claim 18 wherein the adjustable ring is D-shaped.

* * * * *